US011370157B2

(12) United States Patent
Riedl

(10) Patent No.: US 11,370,157 B2
(45) Date of Patent: *Jun. 28, 2022

(54) COEXTRUSION OF PERIODICALLY MODULATED STRUCTURES

(71) Applicant: GIESECKE+DEVRIENT MOBILE SECURITY GMBH, Munich (DE)

(72) Inventor: Josef Riedl, Attenkirchen (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 481 days.

This patent is subject to a terminal disclaimer.

(21) Appl. No.: 16/461,570

(22) PCT Filed: Nov. 15, 2017

(86) PCT No.: PCT/EP2017/001339
§ 371 (c)(1),
(2) Date: May 16, 2019

(87) PCT Pub. No.: WO2018/091140
PCT Pub. Date: May 24, 2018

(65) Prior Publication Data
US 2020/0061898 A1 Feb. 27, 2020

(30) Foreign Application Priority Data
Nov. 18, 2016 (DE) .......................... 102016013776.2

(51) Int. Cl.
*B29C 48/07* (2019.01)
*B29C 48/305* (2019.01)
(Continued)

(52) U.S. Cl.
CPC .......... *B29C 48/92* (2019.02); *B29C 48/0011* (2019.02); *B29C 48/07* (2019.02);
(Continued)

(58) Field of Classification Search
CPC ..... B29C 48/0011; B29C 48/07; B29C 48/08; B29C 48/16; B29C 48/17; B29C 48/175;
(Continued)

(56) References Cited

U.S. PATENT DOCUMENTS 3,540,964 A   11/1970 Nauta
4,185,951 A   1/1980 Webermeier et al.
(Continued)

FOREIGN PATENT DOCUMENTS

DE   2622289 A1   12/1977
DE   3219092 A1   11/1983
(Continued)

OTHER PUBLICATIONS

German Search Report from DE Application No. 102016013776.2, dated Aug. 10, 2017.
(Continued)

*Primary Examiner* — Xiao S Zhao
*Assistant Examiner* — Joseph S Leyson
(74) *Attorney, Agent, or Firm* — Workman Nydegger

(57) ABSTRACT

The invention is directed to a method for manufacturing a foil having a variable strip geometry, which makes it possible to supply a foil that bears a complex security feature. The present invention is further directed to a corresponding data carrier having the foil supplied, and to the foil itself. The invention further relates to an extruder system for manufacturing a foil having a variable strip geometry and to a computer program product having control commands that implement the proposed method and/or operate the proposed extruder system.

10 Claims, 12 Drawing Sheets

(51) Int. Cl.
*B29C 48/19* (2019.01)
*B29C 48/20* (2019.01)
*B29C 48/08* (2019.01)
*B29C 48/495* (2019.01)
*B29C 48/92* (2019.01)
*B29C 48/31* (2019.01)
*B29C 48/17* (2019.01)
*B29C 48/00* (2019.01)
*B29C 48/49* (2019.01)
*B29L 7/00* (2006.01)

(52) U.S. Cl.
CPC .............. *B29C 48/08* (2019.02); *B29C 48/17* (2019.02); *B29C 48/175* (2019.02); *B29C 48/19* (2019.02); *B29C 48/20* (2019.02); *B29C 48/307* (2019.02); *B29C 48/31* (2019.02); *B29C 48/49* (2019.02); *B29C 48/495* (2019.02); *B29L 2007/008* (2013.01)

(58) Field of Classification Search
CPC ....... B29C 48/18; B29C 48/185; B29C 48/19; B29C 48/20; B29C 48/307; B29C 48/31; B29C 48/315; B29C 48/49; B29C 48/495
See application file for complete search history.

(56) References Cited

U.S. PATENT DOCUMENTS

| | | | |
|---|---|---|---|
| 4,756,557 A | 7/1988 | Kaule et al. | |
| 5,725,814 A * | 3/1998 | Harris | ................... B29C 48/12 264/40.3 |
| 5,762,975 A | 6/1998 | Rockstedt | |
| 8,695,883 B2 | 4/2014 | Riedl | |
| 9,012,019 B2 | 4/2015 | Riedl | |
| 9,067,390 B2 | 6/2015 | Riedl | |
| 2001/0038160 A1 | 11/2001 | Peter et al. | |
| 2005/0062185 A1* | 3/2005 | Piedboeuf | ............. B29C 48/495 264/75 |
| 2006/0038310 A1 | 2/2006 | Lipson | |
| 2011/0114731 A1 | 5/2011 | Riedl | |
| 2012/0251753 A1 | 10/2012 | Riedl | |
| 2013/0094064 A1 | 4/2013 | Massicot et al. | |
| 2014/0138444 A1 | 5/2014 | Riedl | |
| 2015/0056432 A1 | 2/2015 | Solberg | |
| 2017/0312966 A1 | 11/2017 | Haindl et al. | |

FOREIGN PATENT DOCUMENTS

| | | |
|---|---|---|
| DE | 3446861 A1 | 7/1986 |
| DE | 19504119 A1 | 8/1996 |
| DE | 102009058803 A1 | 6/2011 |
| EP | 2842715 A1 | 3/2015 |
| EP | 2736729 B1 | 8/2015 |
| EP | 3015243 A1 | 5/2016 |
| FR | 1384293 A | 1/1965 |
| JP | S6132732 A | 2/1986 |
| WO | 2009153056 A2 | 12/2009 |
| WO | 2011072818 A1 | 6/2011 |

OTHER PUBLICATIONS

International Search Report from PCT Application No. PCT/EP2017/001339, dated Mar. 13, 2018.

* cited by examiner

COEXTRUSION OF PERIODICALLY MODULATED STRUCTURES

BACKGROUND

The present invention is directed to a method for manufacturing a foil having a variable strip geometry, which makes it possible to supply a foil that bears a complex security feature. The present invention is further directed to a corresponding data carrier or a value document having the supplied foil, and to the foil itself. Further, an extruder system is proposed for manufacturing a foil having a variable strip geometry, and a computer program product having control commands that implement the proposed method and/or operate the proposed extruder system.

EP 2 736 729 B1 shows a data carrier card having a card body comprising one or several foils and a security thread integrated into the card body, wherein at least one of the foils is manufactured by coextrusion and has at least two strips disposed next to one another in the surface. Such a foil having alternating strips is generally referred to as a strip foil.

DE 195 04 119 A1 shows a generally known extruder, having a nozzle head, which is mounted transversely to the plastic flow so as to be displaceable longitudinally in a rail guide of an intermediate plate arranged between the outlet of the extruder and the nozzle head, and which can be removed from the intermediate plate by means of the longitudinal displacement. The longitudinal displacement of the nozzle head serves for better cleanability of the extruder.

EP 3 015 243 A1 shows that in the manufacture of foils or plates using a smoothing unit, the foil or plate is fed into the smoothing unit already in that geometry which is also to intended to be achieved at the end of the process. A foil or plate smoothing process is thus characterized among other things in that the width of the foil or plate web fed into the smoothing unit is not changed by the smoothing process. This publication teaches to adapt the thickness of the plastic foil web or of the plastic plate web.

In general, it is known to supply a card-shaped data carrier, for example a credit card, by supplying several foils which are laminated to one another to form a card body. For this purpose, it is known to introduce different security features into the card body. For example, it is known to introduce particles into the foils, which are diffusely distributed and thus cause a special optical effect.

In general, there is a need to further develop existing security features and to supply value documents in such a manner that these are forgery-proof or can only be reworked with very great effort. It is thus always attempted to configure particularly individual security features which can then not be supplied in accordance with conventional methods. Thus, for example, biometric features, for example a photograph, can be attached to a data carrier, which are intended to make the data carrier particularly forgery-proof.

Thus, different printing techniques are known with which value documents can be individualized. In this case, care must always be taken to ensure that the security features do not impair the functionality of the data carrier. Thus, chip cards typically have various electronic components which must not be disturbed by corresponding security features, such as a foil. Thus, a chip card is typically supplied with current by means of an induction coil. In this case, care must be taken to ensure that a foil does not impair the functionality of such a coil.

Further, according to conventional methods, a so-called strip foil is supplied, which is manufactured by means of coextruded strips. These coextruded strips are arranged alternately and are always of equal width in the extrusion direction. In this manner, for example, transparent strips can be introduced into a value document. For this purpose, it is known to fuse different materials by means of extrusion in such a manner that certain properties are created. These can, on the one hand, cause an aesthetic effect, or else implement a security feature. In this case, however, it is possible to manufacture such strip foils already using commercially available extruders. Thus, there is the disadvantage that these foils can be reworked using conventional means, and that the strips within the foil thus do not supply a reliable security feature.

SUMMARY

It is thus an object of the invention to propose a method for manufacturing a foil having a security feature. In this case, it is required that the technical effort is small for the authorized user who has specially arranged production devices, however that reworking this security feature constitutes a great effort for unauthorized persons. Further, it is an object of the present invention to propose a corresponding data carrier and/or an extruder system for manufacturing a foil having the security feature. Further, it is an object of the present invention to supply a computer program product having control commands that implement the proposed method and/or operate the proposed extruder system.

Accordingly, a method is proposed for manufacturing a foil having a variable strip geometry for employment in a data carrier. In this case, an extrusion is effected of at least one first surface and at least one second surface, in such a manner that the surfaces form the foil in a sequence that alternates orthogonally to the extrusion direction, wherein a variation is effected of at least one of the surfaces with respect to its geometry.

The proposed method is used in the manufacture of a data carrier, typically a value document. A value document is, for example, a credit card or a chip card, which is also referred to as a card-shaped data carrier. Further, however, it is also possible to use the proposed method for other data carriers or value documents. Thus, certain data pages, ID cards, payment cards or the like are further possible fields of application. A data page is a value document which is introduced into a book-shaped further value document. Thus, passports typically contain a page which has corresponding electronic components which can be read out by means of an over-the-air interface.

The proposed foil and/or the method for manufacturing the foil are suitable for employment in a value document or in a data carrier. For this purpose, it is possible, for example, to laminate the foil together with further foils in such a manner that a card body is created. The proposed foil is a strip foil having a variable strip geometry. A strip foil is generally arranged from alternating surfaces, wherein individual surfaces can be narrower than others and thus form a strip. According to the invention, it is proposed that, according to the supplied method or the extruder system, the strip geometry can be adapted according to the specifications of the manufacturer. Thus, there is generally a variable strip geometry in such a manner that, after a manufacturing process, the desired strip shape or the desired surface shape is present within the foil. According to the invention, it is thus possible to adapt individual strips with respect to their width and in their extension. In this manner, a foil is supplied which, if it is laminated together with further foils and forms a data carrier or value document, can represent a security feature.

According to the invention, it is proposed to extrude at least one first surface and at least one second surface, in such a manner that the surfaces form the foil in a sequence that alternates orthogonally to the extrusion direction. Thus, typically, a plastic is melted and formed planarly by means of an extruder or several extruders. Several extruders can be provided in this case, or else several extruder nozzles which form different surfaces. Typically, such a foil comprises up to ten surfaces which are arranged alternately. This means that, figuratively speaking, the surfaces are placed next to each other in such a manner that a first surface follows a second surface, and subsequently the first surface again.

The first surface and the second surface can differ in such a manner that they are supplied by different extruders or extruder nozzles. In this case, however, it is also possible to melt different materials and to supply the first surface according to a first material and the second surface according to a second material. Thus, it is also possible to introduce color pigments into the materials, in such a manner that the first surface differs in color from the second surface. Thus, an alternating pattern can be created, which, figuratively speaking, is similar to a crosswalk. Thus, several first surfaces and several second surfaces are typically proposed, which are similar or identical depending on the first type or second type. For example, the first surface is configured to be red and the second surface to be green, as a result of which, when first and second surfaces are alternated, a color pattern of red, green, red, green, red can arise. This is merely exemplary and also applies to further surfaces, thus, for example, a third surface, which is arranged in such a manner that a second surface follows a first surface, and subsequently the third surface.

Generally, the extrusion direction refers to that direction in which the molten material is guided through the extruder and is guided out of the extruder after its production. Further equipment can be employed here, such as, for example, rollers, which are arranged in pairs in such a manner that extruded surfaces or the foil are pressed together further. According to one aspect, such a roller or such a roller pair forms part of the proposed extruder system.

According to the invention, it is now proposed to vary the at least one surface with respect to its geometry. Thus, the geometry is changed during the production process in such a manner that no straight strips or no straight surfaces are created on the foil. Conventionally, it is known to supply strip foils in such a manner that a surface follows a strip, which in turn is followed by a surface. According to the invention, this concept is modified in such a manner that the strips and consequently also the surfaces surrounding them are no longer formed to be straight, but that individual surfaces taper or widen, in such a manner that no straight strip is created, but rather an individually adjustable pattern, which can be reworked only with great technical effort. Thus, it is ensured that the resulting surfaces within the foil are no longer straight, but can represent any geometry.

When a surface is varied in geometry, this implies typically that adjacent surfaces are likewise adapted with respect to their geometry, since the surfaces typically abut one another in a form-fitting manner. When a curvature is thus worked into a first surface, a corresponding curvature is also worked into the adjoining surface. Different patterns are conceivable here; in particular different colors are also conceivable with respect to the individual surfaces. In this manner, a pattern is created, which is not yet known to be made from foil in this manner and can thus be considered to be a security feature.

According to one aspect of the present invention, the varying of the geometry is effected in the extrusion direction and/or in an orthogonal extrusion direction. This has the advantage that the varying in the extrusion direction can be effected, for example, in such a manner that a surface is subdivided and thus in turn a specific pattern is supplied that differs from known patterns. When, on the other hand, the geometry is varied in the orthogonal extrusion direction, a widening of a strip or of a surface can be carried out. In this case, it is particularly advantageous to vary the geometry both in the extrusion direction and also in the orthogonal extrusion direction in such a manner that adjustable patterns are created. Thus, diagonal surfaces can also be implemented in such a manner that an existing strip extends diagonally through the foil in one direction.

Since the foil is substantially formed two-dimensionally due to its thin nature, it is thus possible to obtain any line layout on a x-y axis.

According to a further aspect of the present invention, the varying of the geometry is effected by means of a transverse movement of at least one roller of an extruder. This has the advantage that the melted material, which has already been configured to be planar, can be distorted by means of a movement of a roller in such a manner that, for example, a wave movement is reflected in the surfaces. Thus, it is possible to move the roller in the longitudinal axis in one direction or else back and forth and to thus vary the pressed surfaces with respect to their geometry.

According to a further aspect of the present invention, the varying of the geometry is effected by moving a position-variable distributor rail of the extruder. This has the advantage that further components within the extruder can also be varied with respect to their position in such a manner that a corresponding pattern of the first surfaces and of the second surfaces is created. Further, it is also possible for the geometry to be introduced into the surfaces both by means of a roller and by means of a distributor rail.

According to a further aspect of the present invention, the varying of the geometry is effected by means of an adaptation of a melt flow of the extruder. This has the advantage that the melt flow in the extruder can be adapted by structural adaptation in such a manner that the speed of the melt flow changes or the path of the melt flow changes and thus different geometries of the individual surfaces are created. Thus, using simple technical means, an extruder can be operated which makes it possible to vary the geometries of the surfaces according to the invention.

According to a further aspect of the present invention, the at least one first surface and the at least one second surface differ with respect to their width. This has the advantage that a first surface can be configured to be larger than a second surface and thus a foil can be supplied in which two large surfaces respectively surround a narrower strip. This also represents a security feature and a corresponding aesthetic effect can also be produced. Further, it is also possible, for example, to configure the thinner surface as a transparent surface in order to create a distinguishing feature to conventional strip foils in turn.

According to a further aspect of the present invention, several first surfaces and several second surfaces are provided, wherein the first surfaces are of equal width and the second surfaces are of equal width. This has the advantage that the first surfaces are always equal with respect to their geometry. This also applies to the second surfaces. The foil according to the invention can thus be supplied with little technical effort or the proposed method can be implemented in a technically simple manner.

According to a further aspect of the present invention, at least one surface is formed from different materials. This has the advantage that an alternating pattern can also be created within one single surface. Thus, a surface can in turn comprise different materials which have different color or structural features.

According to a further aspect of the present invention, at least one surface is composed of several partial surfaces. This has the advantage that a surface can be structured in a mosaic-like manner, for example, or else that a specific color pattern can be implemented within one single surface.

According to a further aspect of the present invention, at least one surface is formed in a meandering manner, strip-shaped manner and/or with varying width. This has the advantage that different security features can be supplied, which make it possible for a viewer to determine the presence of the varied geometry without technical aids. Thus, it is made possible according to the invention that a multiplicity of patterns can be taken into account in the configuration of a foil and thus special customer requirements can also be satisfied. In particular, it is also possible to combine individual patterns.

According to a further aspect of the present invention, at least one surface is arranged diagonally within a foil area. This has the advantage that a strip can be produced within the foil which differs uniquely from conventional security features. This is possible, for example, in such a manner that a roller which is arranged downstream of the extruder is moved according to said roller's longitudinal axis and thus a diagonal distortion of the surfaces within the foil is obtained.

According to a further aspect of the present invention, color pixels are arranged on the foil by means of a matrix block having punctiform and/or elliptical passages. This has the advantage that individual components of the foil are formed with small color points, in such a manner that, for example, a certain color effect is established. Thus, it is possible to supply color transitions and, in general, to introduce specific patterns into the foil in one processing step.

The object is also achieved by a foil manufactured by means of a method as already described. The foil thus has at least one first surface and one second surface, which are varied with respect to their geometry in such a manner that they differ from the known geometry type, which only provides strips. Thus, the present invention is also directed to the foil itself and at a data carrier or a value document having the foil. It is possible here to laminate together further foils with the foil according to the invention in such a manner that a card body is supplied.

The object is also achieved by an extruder system for manufacturing a foil having a variable strip geometry for employment in a data carrier or a value document. For this purpose, an extruder unit is provided that is arranged to extrude at least one first surface and at least one second surface, in such a manner that the surfaces form the foil in a sequence that alternates orthogonally to the extrusion direction, wherein a variation unit is provided that is arranged to vary at least one of the surfaces with respect to its geometry. The variation unit can be present, for example, as a roller or a roller pair or else as a position-variable distributor rail.

The object is further achieved by a computer program product having control commands that implement the proposed method and/or operate the proposed system arrangement.

According to the invention, it is particularly advantageous that the method steps can be reworked as structural features of the extruder system or in the foil. The extruder system is arranged to carry out the proposed method. The proposed foil in turn has, in structural form, those features which are produced by means of the method.

Further advantageous embodiments are explained in more detail with reference to the attached figures. The figures are described as follows:

DETAILED DESCRIPTION OF VARIOUS EMBODIMENTS

Figure 1:
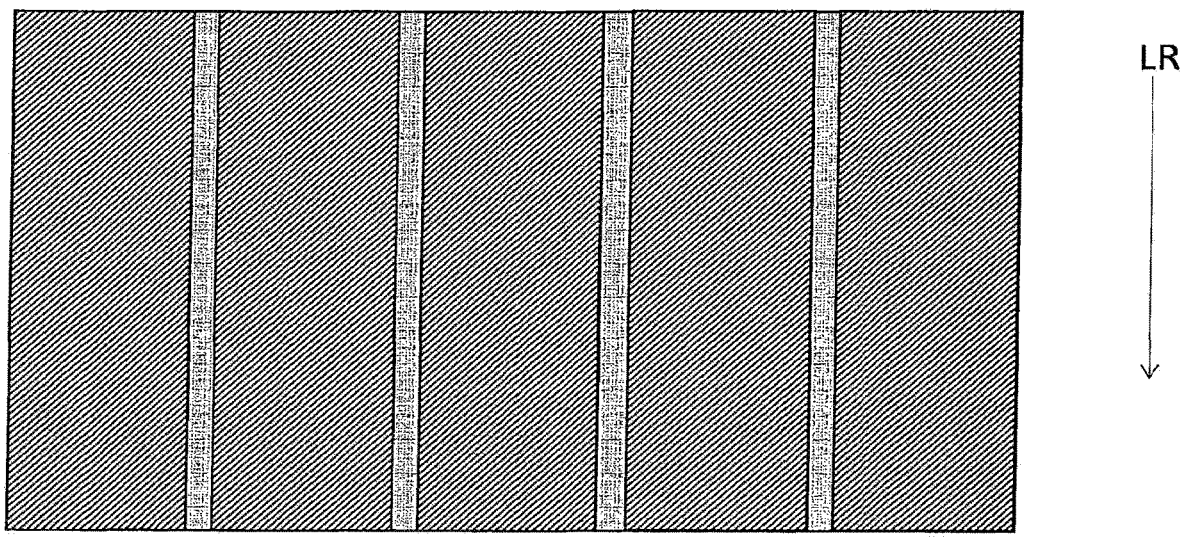
FIG. 1: a foil having alternating surfaces according to the prior art.

FIG. 1 shows a foil having a fixed strip geometry in such a manner that a first surface is arranged on the left-hand side, whereupon a second strip-shaped surface follows. This in turn is followed by a first surface and a strip-shaped second surface. This follows in an alternating manner until a first surface laterally closes the foil. As shown on the right, the strip geometry always follows the running direction of the extruder and is not varied during the manufacturing process. This means that merely straight surfaces are created on the foil and the corresponding instruments do not have to be readjusted, i.e. varied. This is referred to in the present case as a fixed strip geometry.

Figure 2:
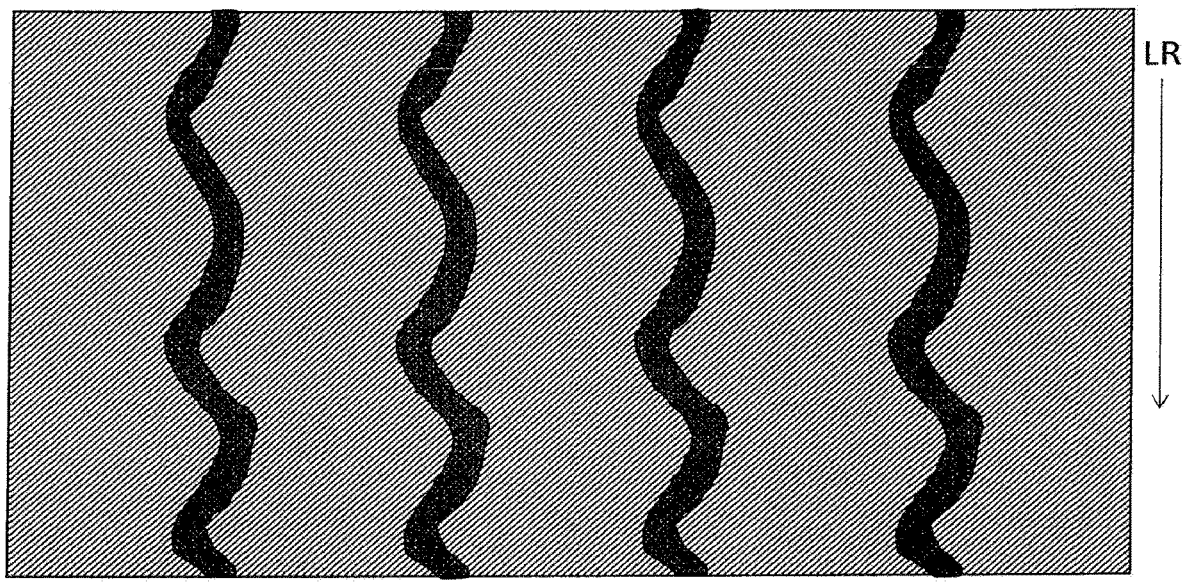
FIG. 2: a foil having alternating surfaces that are varied according to the invention.

FIG. 2, on the other hand, shows a varied strip geometry in such a manner that in the manufacturing process the corresponding components, for example a distributor rail or at least one roller, are varied, and thus the variation pattern is also realized in the surface geometry. As can be seen in FIG. 2, on the left side a second surface follows a first surface, as a result of which a first surface is arranged leftmost and rightmost. The second surface can be referred to as a strip-shaped surface which is configured in a meandering shape. As can be seen in the present FIG. 2, the strip geometry is varied, as a result of which precisely no straight and fixed strip geometry is created. This is advantageous according to the invention, since control staff can recognize such a strip geometry without employing technical aids. Thus, it can also be determined whether the variable strip geometry is present as a security feature in a value document.

Figure 3:
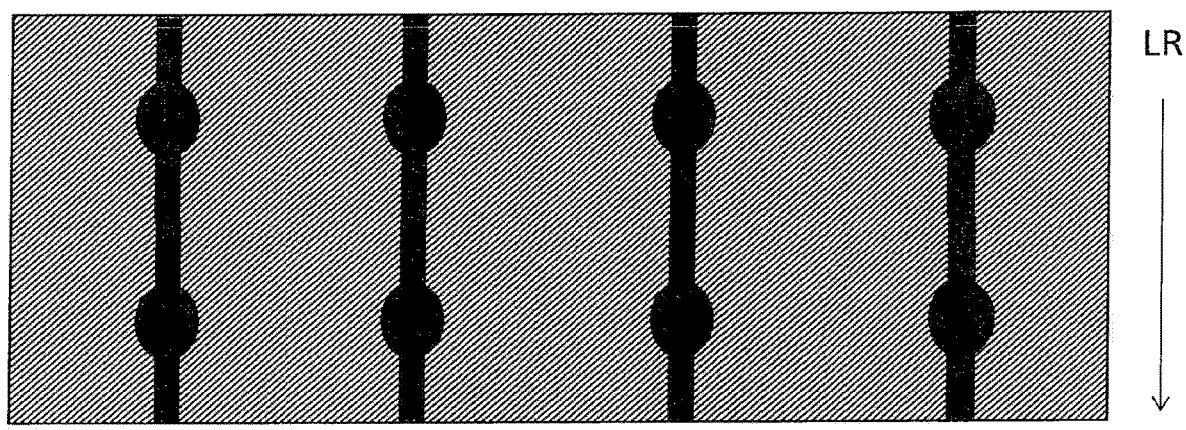
FIG. 3: a foil having alternating and drop-shaped strips or surfaces according to one aspect of the present invention.

FIG. 3 likewise shows a variable strip geometry in which corresponding variation units have to be readjusted. Thus, in the extrusion direction, first a straight surface or strip follows which is then widened and subsequently tapered in such a manner that a drop shape is formed. The second surfaces are thus varied in such a manner that they are first formed in a strip-like manner, then in drop-shaped manner, then in turn in a strip-shaped manner and in a drop-shaped manner.

Figure 4:
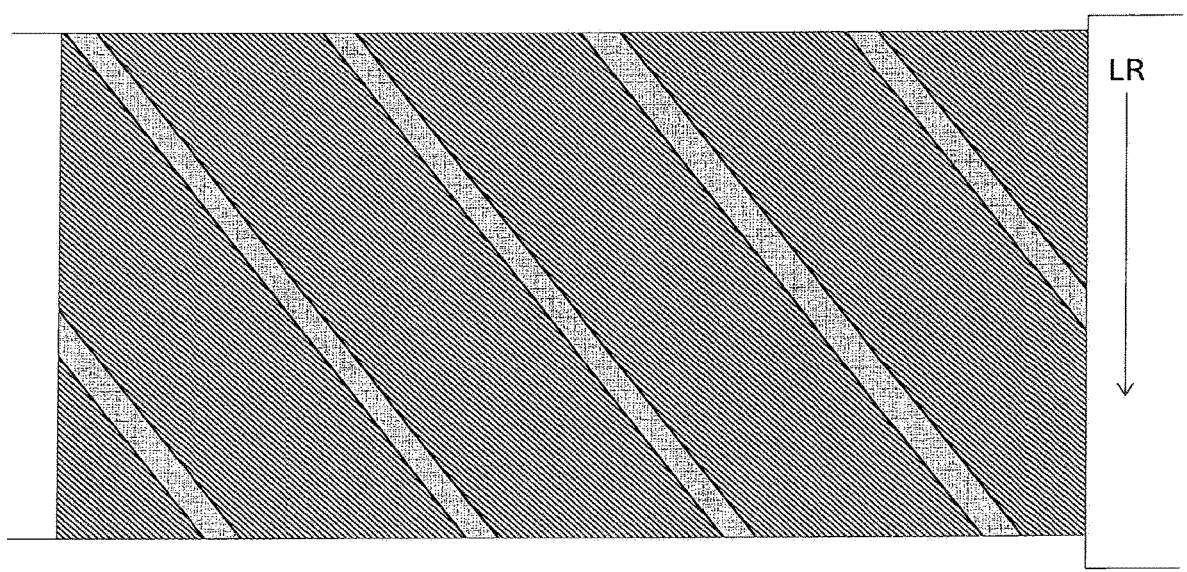
FIG. 4: a foil having diagonal surfaces according to one aspect of the present invention.

FIG. 4 shows alternating surfaces, wherein the second surfaces are each formed in a strip shape. The diagonal strips can also be combined with the pattern according to FIG. 3, for example.

Figure 5:
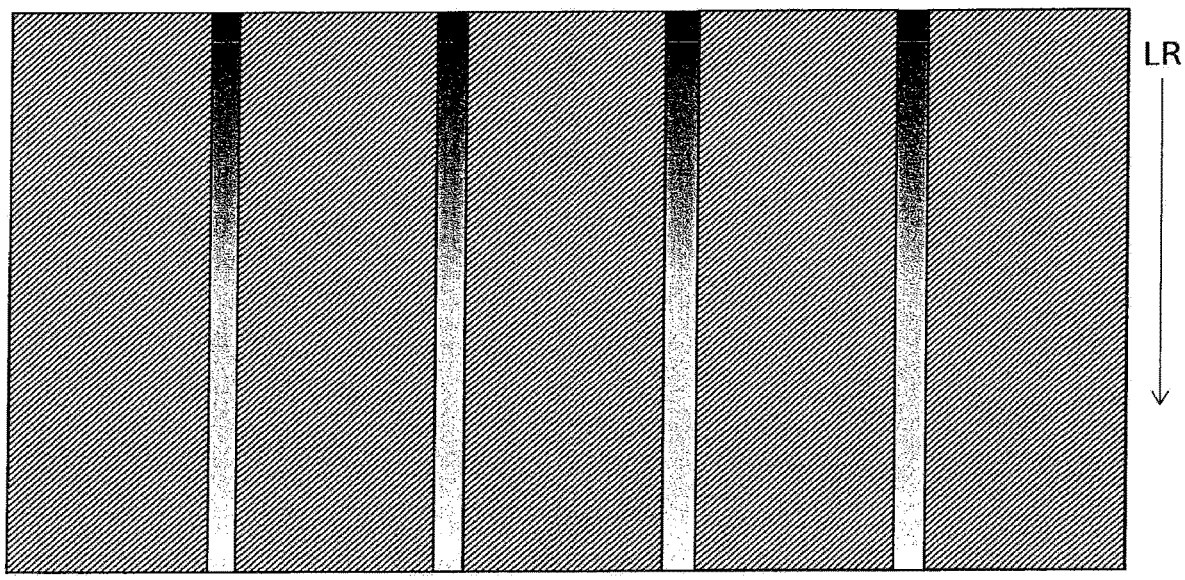
FIG. 5: a foil having alternating strips and/or surfaces and materials or material properties that change in a slowly flowing manner in the flow direction according to one aspect of the present invention.

FIG. 5 shows a foil with alternating strips and surfaces and materials and/or material properties that change in slowly flowing manner in the flow direction. This structure can be combined with the variation of the strip geometry proposed according to the invention. It is particularly advantageous here that conventional manufacturing techniques can be combined with the technique according to the invention or the proposed method.

Figure 6:
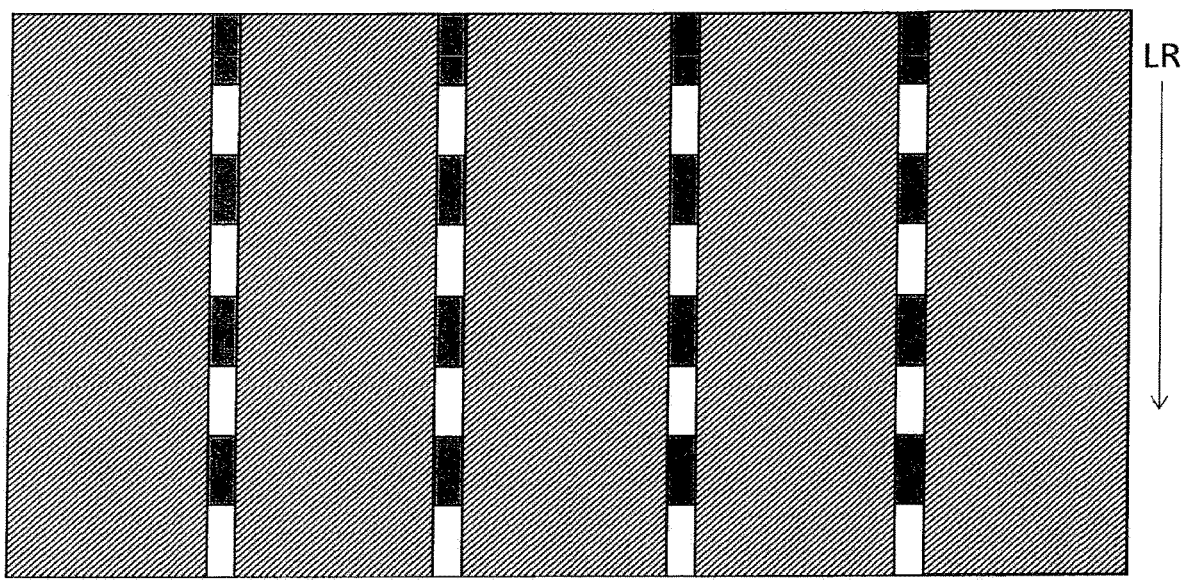
FIG. 6: a foil having alternating strips and/or surfaces and materials or material properties that change in the flow direction according to one aspect of the present invention.

FIG. 6 shows a foil with alternating strips and surfaces and materials and/or material properties that change immediately in the flow direction. It can be seen in the present figure that the second surface, i.e. the strips, are subdivided in such a manner that a predetermined structure or coloring is attained. Thus, it is possible, for example, to split the second surface into partial surfaces and to also employ different materials with different colors for this purpose. This also represents a particularly secure feature, since the special geometry of the second surfaces can be reworked only with considerable technical effort.

Figure 7:
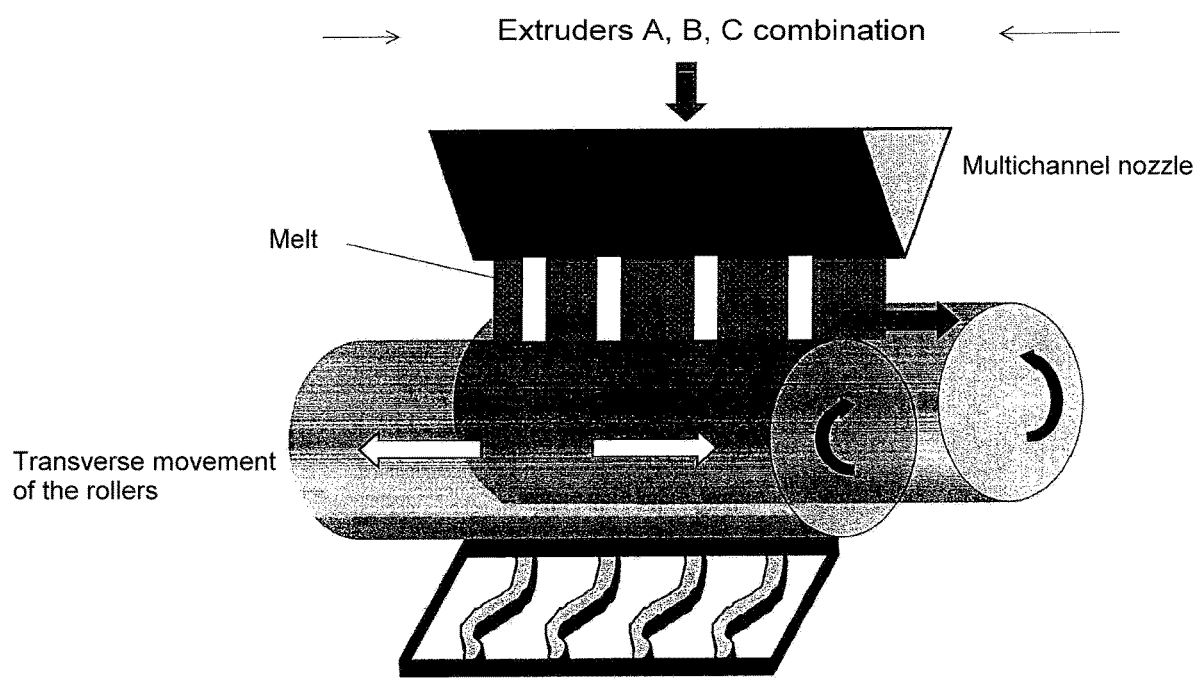
FIG. 7: an extruder system for manufacturing the foil according to the invention according to one aspect of the present invention.

FIG. 7 shows an extruder system as is known with respect to the general type of construction, but which is adapted in such a manner that at least one roller carries out a transverse movement. As is shown in the present figure, the roller is guided along the arrows in the longitudinal direction, as a result of which at the end of the extruder, i.e. at the bottom in the present figure, a wave-shaped second surface is created in the foil. The foil at the lower end of FIG. 7 thus corresponds to the proposed foil having five first surfaces and four second surfaces, which are each varied with respect to their geometry during the manufacturing process.

Figure 8:
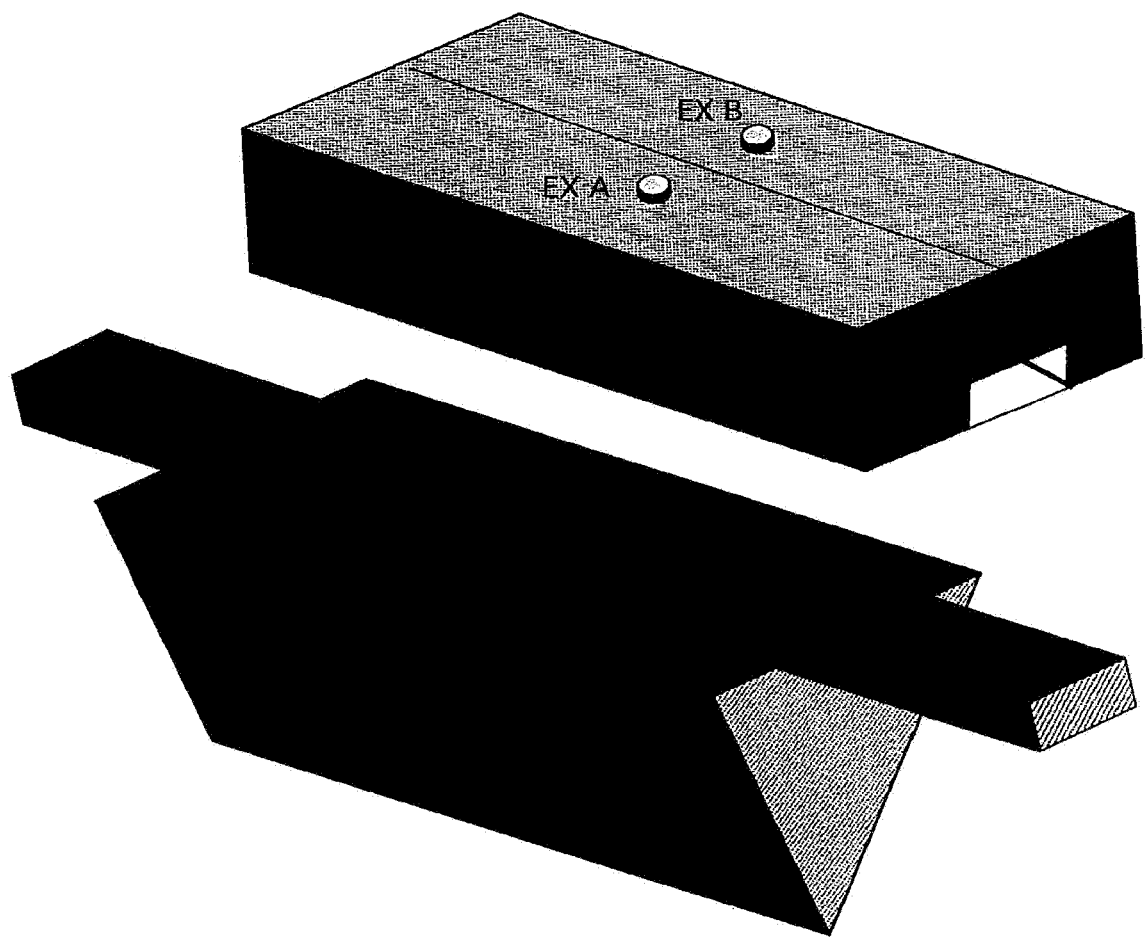
FIG. 8: a schematic nozzle block and a position-variable distributor rail and nozzle lips according to one aspect of the present invention.

FIG. 8 shows a schematic nozzle block in which the distribution can be effected to the left and right in the block in the coat-hanger system. As indicated by the arrows in the present FIG. 8, the distributor rail is configured to be position-variable and can be varied both in accordance with its longitudinal direction and also with respect to its height. In this case, for example, foils can be manufactured as are shown in FIGS. 2 and 4.

Figure 9:
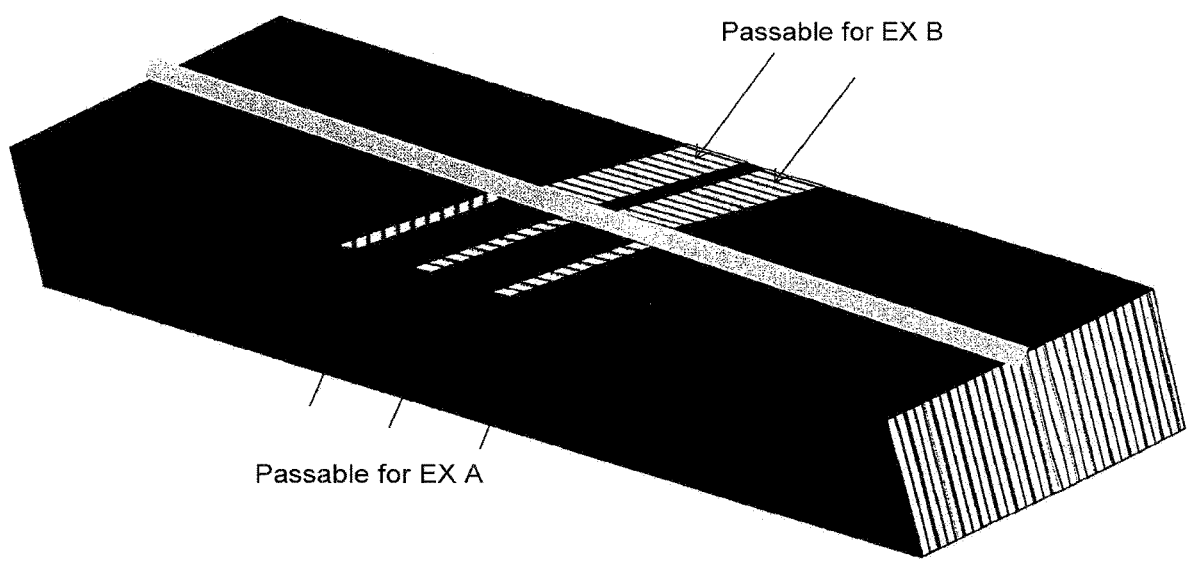
FIG. 9: a schematic distributor rail in a side view according to one aspect of the present invention.

FIG. 9 shows a schematic illustration of a distributor rail having passages for a first extruder and a second extruder. The construction of the rail must be such that a uniform mass pressure is always present during displacement.

Figure 10:
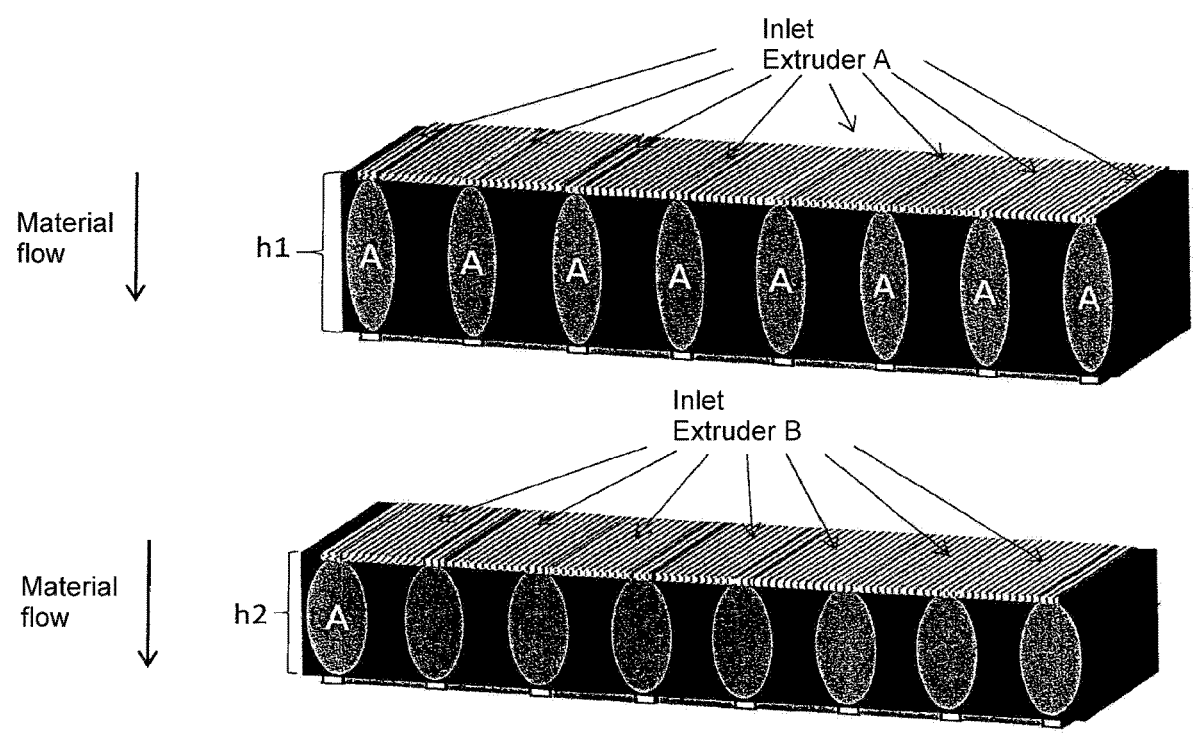
FIG. 10: varying a melt flow according to one aspect of the present invention.

FIG. 10 shows a rail with variable height. In this case, a first position is indicated in the upper half of FIG. 10 and a second position of the rail is indicated in the lower half. As is shown on the left, the height h1 and h2 thus varies. The smaller melt flow in the extruder B is usually compensated by a greater melt flow of the extruder A. Thus, a foil according to FIG. 3 can also be manufactured.

Figure 11:
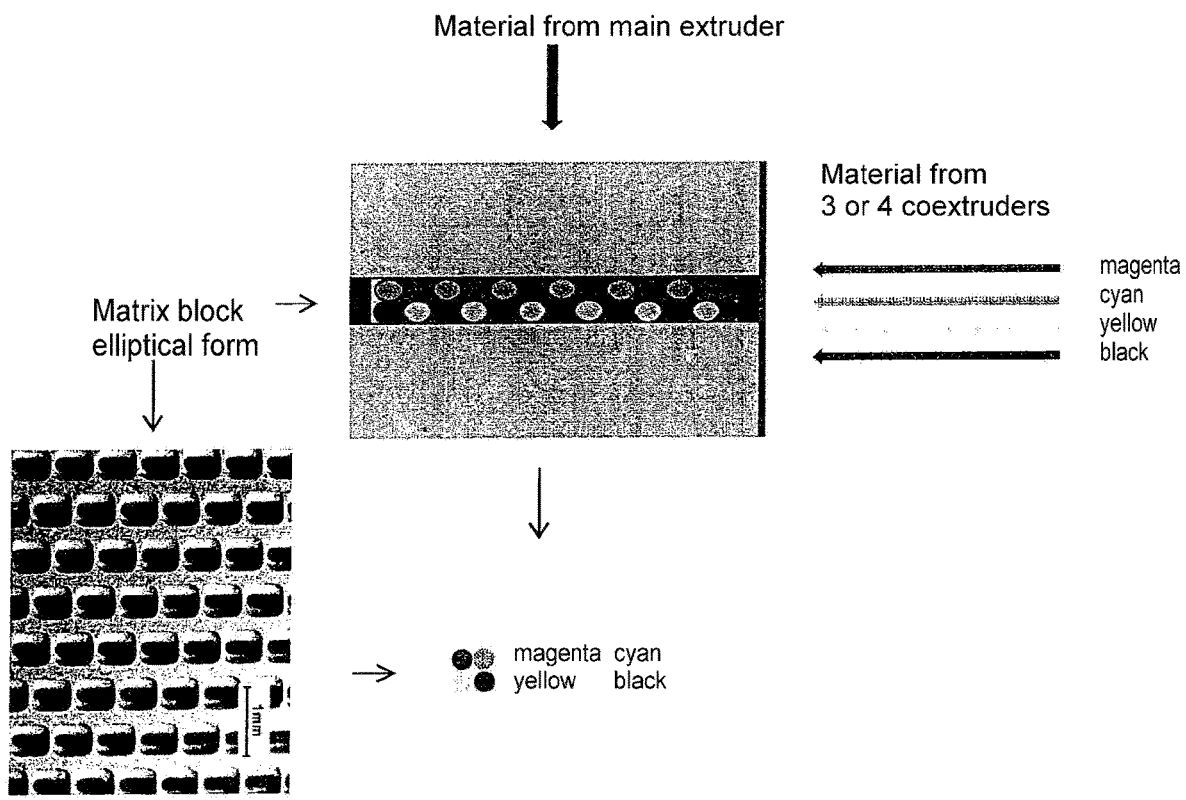
FIG. 11: a matrix block for an extruder according to one aspect of the present invention.

FIG. 11 shows on the left side a matrix block which can be configured in such a manner that different materials can be pressed therethrough and thus color pixels or color points can be applied to the foil or can be introduced into the foil. In this case, it is possible in turn to mix a further color according to a known superimposition of individual colors. Thus, for example, magenta, cyan, yellow and black are suitable as starting colors. A large number of further colors can be produced therefrom. The person skilled in the art recognizes here how he has to adjust the mixing ratio.

Figure 12:
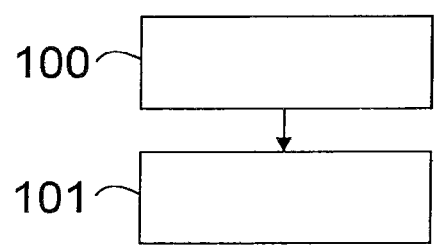
FIG. 12: a flow chart of a method for supplying a foil having a variable strip geometry according to one aspect of the present invention.

FIG. 12 shows in a schematic flow chart a method for manufacturing a foil having a variable strip geometry for employment in a data carrier or a security document. An extrusion 100 follows of at least one first surface and at least one second surface, in such a manner that the surfaces form the foil in a sequence that alternates orthogonally to the extrusion direction, wherein a varying 101 is effected of at least one of the surfaces with respect to its geometry. The person skilled in the art recognizes here that the aforementioned method steps can be carried out iteratively and/or in a different sequence.

The invention claimed is:

1. A method for manufacturing a foil having a variable strip geometry for employment in a data carrier, having:
   extrusion of at least one first surface and at least one second surface, in such a manner that the surfaces form the foil in a sequence that alternates orthogonally to an extrusion direction, wherein a varying is effected of at least one of the surfaces with respect to its geometry;
   wherein the varying of the geometry is effected by means of a transverse movement of at least one roller of an extruder.

2. The method according to claim 1, wherein the varying of the geometry is effected in the extrusion direction and/or orthogonally to the extrusion direction.

3. The method according to claim 1, wherein the at least one first surface and the at least one second surface differ with respect to their width.

4. The method according to claim 1, wherein several first surfaces and several second surfaces are provided, wherein the first surfaces are of equal width and the second surfaces are of equal width.

5. The method according to claim 1, wherein at least one of the surfaces is formed from different materials.

6. The method according to claim 1, wherein at least one of the surfaces is composed of several partial surfaces.

7. The method according to claim 1, wherein at least one of the surfaces is formed in a meandering manner, strip-shaped manner and/or with varying width.

8. The method according to claim 1, wherein at least one of the surfaces is arranged diagonally within a foil surface.

9. The method according to claim 1, wherein color pixels are arranged on the foil by means of a matrix block having punctiform and/or elliptical passages.

10. The method according to claim 1, wherein the number of first surfaces is greater than the number of second surfaces of the foil.

* * * * *